US008645961B2

(12) United States Patent
Yoshimura et al.

(10) Patent No.: US 8,645,961 B2
(45) Date of Patent: Feb. 4, 2014

(54) IMAGE FORMATION APPARATUS AND PROGRAM

(75) Inventors: Tomonari Yoshimura, Kyoto (JP); Atsushi Ohshima, Amagasaki (JP); Masami Yamada, Sennan-gun (JP); Masakazu Murakami, Itami (JP); Takahiro Ikeda, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1459 days.

(21) Appl. No.: 12/044,079

(22) Filed: Mar. 7, 2008

(65) Prior Publication Data

US 2008/0263546 A1    Oct. 23, 2008

(30) Foreign Application Priority Data

Apr. 20, 2007    (JP) .................................. 2007-111405

(51) Int. Cl.
 *G06F 9/46*    (2006.01)
(52) U.S. Cl.
 USPC ........................... 718/102; 718/100; 718/101
(58) Field of Classification Search
 USPC ........................... 718/100, 101, 102; 358/1.1
 See application file for complete search history.

(56) References Cited

U.S. PATENT DOCUMENTS

| | | | | |
|---|---|---|---|---|
| 7,191,212 | B2 * | 3/2007 | Hirai | 709/203 |
| 2001/0034747 | A1 | 10/2001 | Fujitani et al. | |
| 2003/0233617 | A1 * | 12/2003 | Hirai | 715/513 |
| 2004/0056837 | A1 * | 3/2004 | Koga et al. | 345/156 |
| 2005/0277405 | A1 * | 12/2005 | Noguchi | 455/411 |
| 2006/0023247 | A1 | 2/2006 | Yamakawa | |
| 2006/0129912 | A1 * | 6/2006 | Kunori | 715/501.1 |
| 2007/0019222 | A1 * | 1/2007 | Oda et al. | 358/1.13 |
| 2007/0118807 | A1 * | 5/2007 | Komura et al. | 715/764 |
| 2007/0214124 | A1 * | 9/2007 | Tateno | 707/3 |
| 2008/0046840 | A1 * | 2/2008 | Melton et al. | 715/825 |
| 2008/0172220 | A1 * | 7/2008 | Ohshima | 704/9 |
| 2010/0138757 | A1 * | 6/2010 | Shigenobu et al. | 715/760 |

FOREIGN PATENT DOCUMENTS

| | | |
|---|---|---|
| JP | 2001-256025 | 9/2001 |
| JP | 2006-041623 A | 2/2006 |
| JP | 2006-043962 | 2/2006 |

OTHER PUBLICATIONS

Notification of Reason for Rejection in JP 2007-111405 dated Feb. 24, 2009, and an English Translation thereof.

* cited by examiner

*Primary Examiner* — Emerson Puente
*Assistant Examiner* — Willy W Huaracha
(74) *Attorney, Agent, or Firm* — Buchanan Ingersoll & Rooney PC (57) ABSTRACT

An image formation apparatus that has a webpage viewing function includes a job receiver that receives a job execution instruction from a user terminal, a job analyzer that analyzes the received job execution instruction, a job executor that executes a job based on a result of the analysis, and a job registration part that, if the received job execution instruction includes URL information specifying a webpage, registers user identification information pertaining to a user who issued the job execution instruction and the URL information included therein in correspondence with each other such that the webpage can be viewed with use of the URL information.

8 Claims, 7 Drawing Sheets

IMAGE FORMATION APPARATUS AND PROGRAM

This application is based on application No. 2007-111405 filed in Japan, the content of which is hereby incorporated by reference.

BACKGROUND OF INVENTION

1. Field of the Invention

The present invention relates to an image formation apparatus and program that are used in an MFP (Multi Functional Peripheral) etc., and in particular to an image formation apparatus and program that have a webpage viewing function.

2. Related Art

In recent years, there have been proposed image formation apparatuses that have a webpage viewing function. There has also been proposed technology for easily registering URL (Uniform Resource Locator) information, which specifies a webpage, in such image formation apparatuses. For example, Japanese Patent Application Publication No. 2006-41623 discloses an image formation apparatus which uses a scanner to read a manuscript on which URL information has been written, extracts the URL information by OCR (Optical Character Recognition) processing, and registers the URL information. This eliminates the need to input URL information character-by-character using an operation panel, and enables easily registering URL information in the image formation apparatus.

Specific uses of an image formation apparatus include cases in which a user issues a job execution instruction including URL information from a user terminal to cause the image formation apparatus to execute a job, and thereafter uses the operation panel to cause the same job to be executed. Furthermore, there are also cases in which the user does not initially expect to use the operation panel to cause the same job to be executed. In one example of such a case, the user causes the image formation apparatus to print a webpage that was being viewed on the user terminal, sees the print-out of the webpage and realizes that there was an error in the print settings, and uses the operation panel to cause the webpage to be printed again with the appropriate print settings.

In conventional image formation apparatuses, if the user desires to cause the same job to be executed again, the user must input the URL information of the webpage character-by-character using the operation panel, which causes the user to feel bothered. Also, Japanese Patent Application Publication No. 2006-41623 discloses an image formation apparatus in which a manuscript on which URL information is written must be provided in advanced, thereby being ineffective in situations such as described above, where the user does not initially expect to cause the same job to be executed again.

SUMMARY OF INVENTION

In view of this, an aim of the present invention is to provide an image formation apparatus and program that can register URL information without causing a user to feel bothered.

In order to solve the above problem, an image formation apparatus pertaining to the present invention is an image formation apparatus that has a webpage viewing function, including: a job receiver operable to receive, from a user, a job execution instruction that includes user identification information and URI information which specifies a webpage pertaining to a job; a job executor operable to execute the job in accordance with the received job execution instruction; and a registration part operable to register the user identification information and the URI information in correspondence with each other such that the webpage can be viewed with use of the URI information included in the received job execution instruction.

In order to solve the above problem, a program pertaining to the present invention is a program that causes an image formation apparatus which includes a webpage viewing function to perform the steps of: receiving, from a user, a job execution instruction that includes user identification information and URI information which specifies a webpage pertaining to a job; executing the job in accordance with the received job execution instruction; and registering the user identification information and the URI information in correspondence with each other such that the webpage can be viewed with use of the URI information included in the received job execution instruction.

According to the above structure and program, if a job execution instruction includes URI information, the URI information is registered such that a webpage can be viewed with use thereof. The URI information can therefore be registered without causing the user to feel bothered. Note that URI (Uniform Resource Identifier) information is a concept that includes URL information, and is information that specifies where an information resource exists on a network.

Also, the image formation apparatus may further include: a login instruction receiver operable to receive a login instruction that includes the user identification information, from the user via an operation panel; and a display part operable to display the webpage with use of the URI information that has been registered in correspondence with the user identification information included in the received login instruction.

According to this structure, when the user merely logs in, a webpage corresponding to the user is displayed. This therefore enables the user to view the webpage without feeling bothered.

Also, if a plurality of pieces of the URI information have been registered in correspondence with the received user identification information, the display part may display the webpage with use of a most recently registered one of the URI information pieces.

Since the image formation apparatus registers URI information each time a job execution instruction including URI information is received, there are cases in which two or more URI information pieces have been registered in correspondence with the user identification information. According to the above structure, in such cases, a webpage specified by the most recently registered URI information pieces is displayed. Generally, when causing the same job to be executed again, the user would often cause the job to be executed with use of the most recently registered URI information piece. Accordingly, selectively displaying the webpage specified by the most recently registered URI information piece enables improving convenience for the user.

Also, if a predetermined time period has elapsed since the most recently registered URI information piece was registered, the display part may display a menu screen instead of displaying the webpage with use of the most recently registered URI information piece.

Generally, as the amount of time that has elapsed since a job was executed increases, the probability that the user will cause the same job to be executed again decreases, and the probability that the user will cause a completely different job to be executed increases. According to the above structure, if the predetermined time period has elapsed, a menu screen is displayed instead of the webpage specified by the most recently registered URI information piece. Displaying the menu screen if the predetermined time period has elapsed enables further improving convenience for the user.

Also, if a plurality of pieces of the URI information have been registered in correspondence with the received user identification information, the display part may display the webpage with use of a user-selected one of the URI information pieces.

As mentioned above, there are cases in which two or more URI information pieces have been registered in correspondence with the user identification information. According to the above structure, in such cases, a webpage specified by a URI information piece selected by the user is displayed. The user can therefore view a desired webpage by merely selecting a URI information piece.

Also, the job receiver may receive the job execution instruction via a user terminal, the job execution instruction may further include a plurality of other URI information pieces, each specifying a different webpage that was viewed on the user terminal before the webpage pertaining to the job, and viewing order information that specifies an order in which the webpages specified by the other URI information pieces were viewed on the user terminal, the registration part may register the plurality of other URI information pieces and the viewing order information in correspondence with the user identification information, and the display part may display the webpages specified by the other URI information pieces in the viewing order specified by the viewing order information, in accordance with a user operation.

According to this structure, by merely performing a simple operation, the user can view a desired webpage by tracking back the order in which webpages were viewed on the user terminal.

Also, the registration part may register other URI information in correspondence with the user identification information, the other URI information specifying a linked webpage that is linked to in the webpage specified by the URI information included in the job execution instruction, and upon reception of a user operation for causing the linked webpage to be displayed, the display part may display the linked webpage.

According to this structure, by merely performing a simple operation, the user can view a linked webpage.

Also, the job receiver may receive the job execution instruction one of from the user, who has logged in, via the operation panel; and via a user terminal. Either way, URI information can be registered without causing the user to feel bothered.

Also, the job receiver may receive the job execution instruction from the user, who has logged in, via the operation panel, and upon reception of the login instruction from the user, who has logged out, the display part may display a menu screen instead of displaying the webpage with use of the registered URI information, if a predetermined time period has elapsed since the user logged out.

Generally, as the amount of time that has elapsed since logging out increases, the probability that the user will cause the same job to be executed when logging in again decreases, and the probability that the user will cause a completely different job to be executed increases. According to the above structure, if the predetermined time period has elapsed, a menu screen is displayed instead of a webpage specified by a registered URI information piece. Displaying the menu screen if the predetermined time period has elapsed enables further improving convenience for the user.

BRIEF DESCRIPTION OF DRAWINGS

These and other objects, advantages, and features of the invention will become apparent from the following description thereof taken in conjunction with the accompanying drawings, which illustrate a specific embodiment of the present invention.

In the drawings.

DETAILED DESCRIPTION OF PREFERRED EMBODIMENTS

An embodiment of the present invention is described in detail below with reference to the drawings.

Embodiment

Structure

Figure 1:
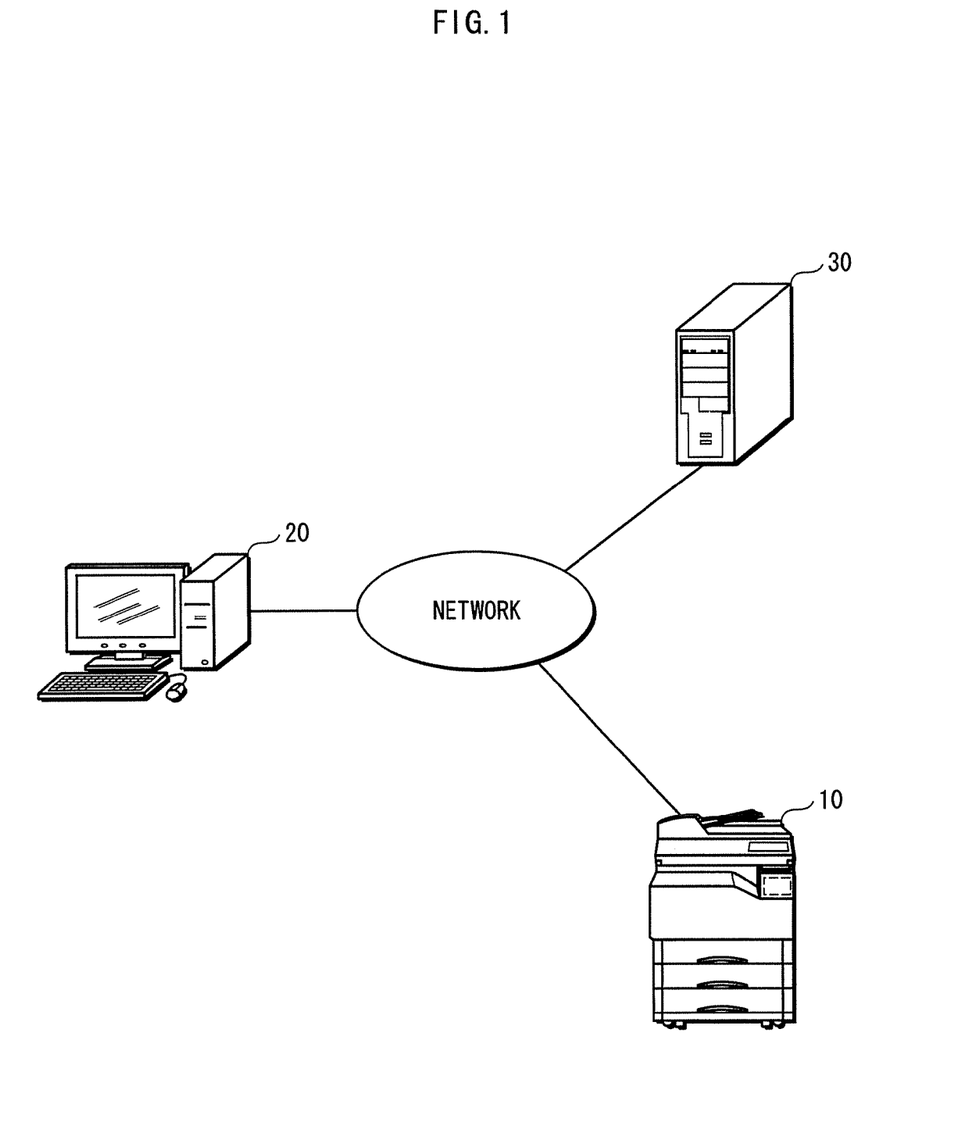
FIG. 1 shows a structure of a system pertaining to an embodiment of the present invention.

FIG. 1 shows a structure of a system pertaining to the present embodiment of the present invention.

The system of the present embodiment includes an image formation apparatus 10, a user terminal 20, and a web server 30. The image formation apparatus 10, the user terminal 20, and the web server 30 can communicate with each other via a network.

Figure 2:
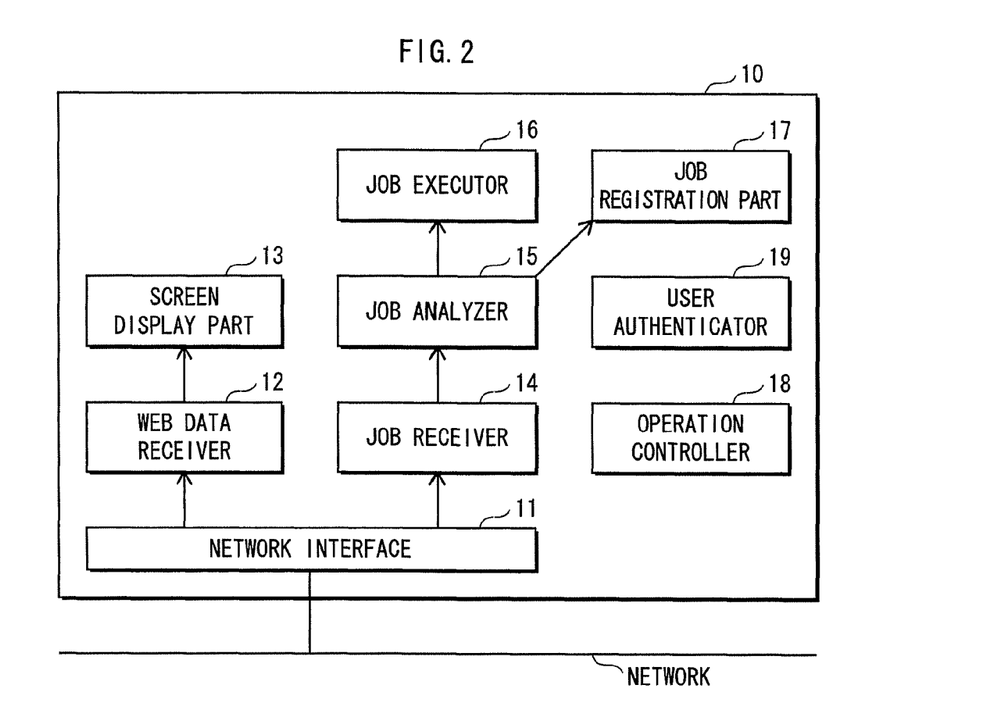
FIG. 2 is a functional block diagram of an image formation apparatus 10 pertaining to the embodiment of the present invention.

FIG. 2 is a functional block diagram of the image formation apparatus 10 pertaining to the present embodiment of the present invention.

The image formation apparatus 10 includes a network interface 11, a web data receiver 12, a screen display part 13, a job receiver 14, a job analyzer 15, a job executor 16, a job registration part 17, an operation controller 18, and a user authenticator 19.

The web data receiver 12 receives web data via the network interface 11. The screen display part 13 displays a webpage on a display based on the received web data. This structure realizes a webpage viewing function.

The job receiver 14 receives a job execution instruction via the network interface 11. The job analyzer 15 analyzes the received job execution instruction and specifies the type of the job and detailed settings of the job. Job types include, for example, print, email transmission, and box storage. If the job type is print, the detailed settings of the job include, for example, a color/monochrome selection, a two-side/one-side selection, and a page size selection. The job executor 16 applies the specified detailed settings and executes the specified type of job. The job registration part 17 registers job identification information 41, user identification information 42, and a reception time 48 indicating when the job execution instruction was received. The job registration part 17 registers such information as job information 40 pertaining to the job executed by the job executor 16 (see FIG. 5).

There are cases in which a job execution instruction, such as for causing a web page to be printed, includes URL information (job URL information 43) for specifying a webpage pertaining to the job. If the job execution instruction includes the job URL information 43, the job registration part 17 registers such job URL information 43 along with the job identification information 41 etc. (see FIG. 5).

Figure 5:
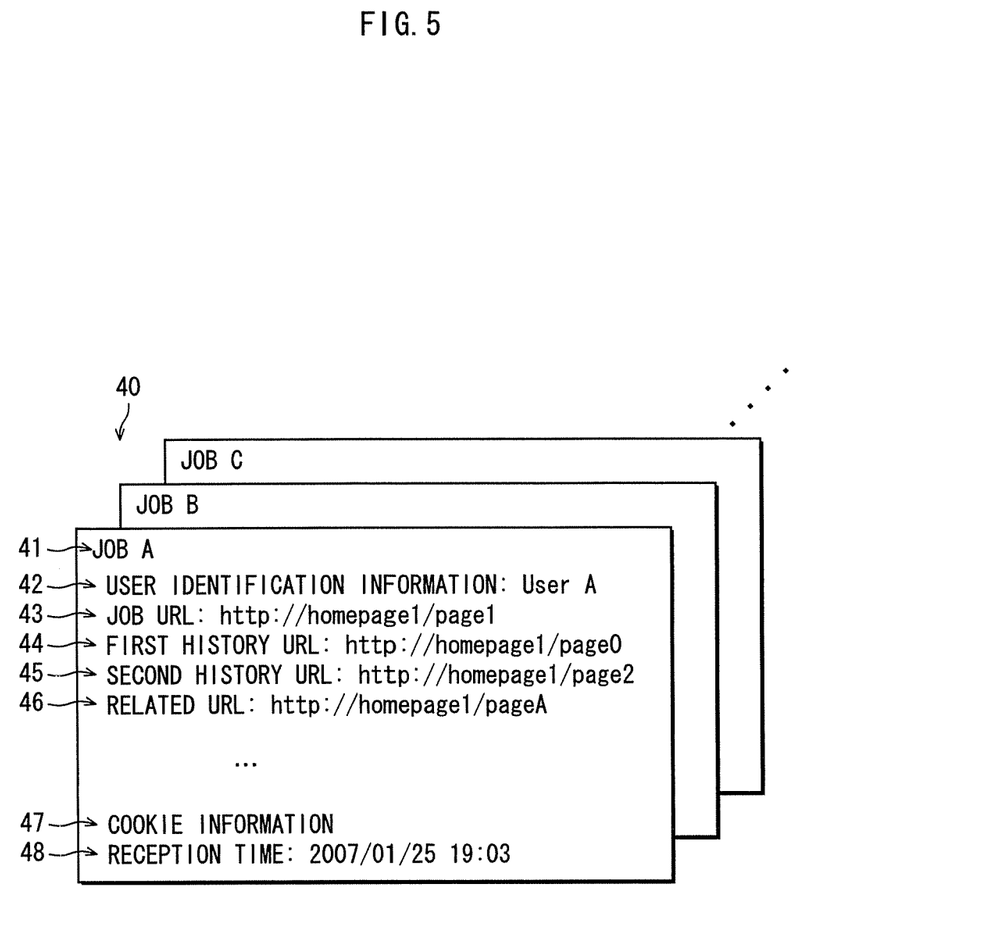
FIG. 5 shows an example of job information.

Also, there are cases in which the aforementioned job execution instruction further includes browsing history information (composed of URL information pieces and viewing order information that specifies a viewing order thereof) that indicates webpages that have been viewed on the user terminal. If the job execution instruction includes the browsing history information, the job registration part 17 registers such browsing history information along with the job identification information 41 etc. (see FIG. 5). FIG. 5 shows an exemplary case in which the browsing history information includes two URL information pieces. The job registration part 17 has registered the two URL information pieces after allocating "first" and "second" to specify the viewing order thereof. First history URL information 44 is a URL information piece that specifies a webpage that was viewed directly before the webpage specified by the job URL information 43. Second history URL information 45 is a URL information piece that specifies a webpage that was viewed directly before the webpage specified by the first history URL information 44.

Also, there are cases in which the aforementioned job execution instruction further includes cookie information 47. If the job execution instruction includes the cookie information 47, the job registration part 17 registers such cookie information 47 along with the job identification information 41 etc. (see FIG. 5).

Also, even if not included in the job execution instruction itself, there is URL information (related URL information 46) that relates to the job. The related URL information 46 is, for example, URL information that specifies a webpage linked to in the webpage pertaining to the job, and URL information that is included in manuscript data pertaining to the job. Such URL information can be obtained by, for example, extracting a tag such as "a href" from web data specified by the job URL information. Also, such URL information can be obtained by, for example, performing OCR processing on the manuscript data pertaining to the job, in order to extract a character string such as "http://". The job registration part 17 registers the related URL information 46 along with the job identification information 41 etc. (see FIG. 5).

The operation controller 18 causes the screen display part 13 to display a webpage and causes the job executor 16 to execute a job, in accordance with a user operation received by the operation panel.

The user authenticator 19 receives a login instruction from a user via the operation panel, and thereafter performs user authentication by comparing user information included in the login instruction and user information that has been registered in advance. The user information is user identification information and a password.

Figure 3:
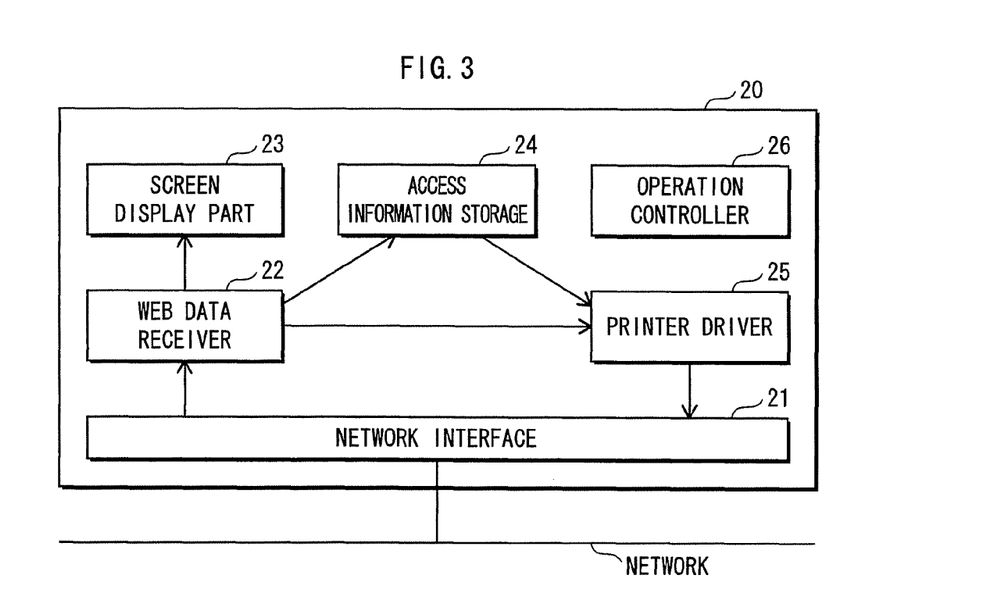
FIG. 3 is a functional block diagram of a user terminal 20 pertaining to the embodiment of the present invention.

FIG. 3 is a functional block diagram of the user terminal 20 pertaining to the present embodiment of the present invention.

The user terminal 20 includes a network interface 21, a web data receiver 22, a screen display part 23, an access information storage 24, a printer driver 25, and an operation controller 26.

The web data receiver 22 receives web data via the network interface 21. The screen display part 23 displays a webpage on a display based on the received web data. The access information storage 24 stores cookie information and a webpage browsing history. This structure supports the webpage viewing function.

The printer driver 25 issues a print job execution instruction to the image formation apparatus 10 in accordance with a user operation. In the case of printing a webpage, the printer driver 25 issues a print execution instruction that includes job URL information, browsing history information, and cookie information.

The operation controller 26 causes the screen display part 23 to display the webpage, in accordance with the user operation received by the operation panel.

Operations

Figure 4:
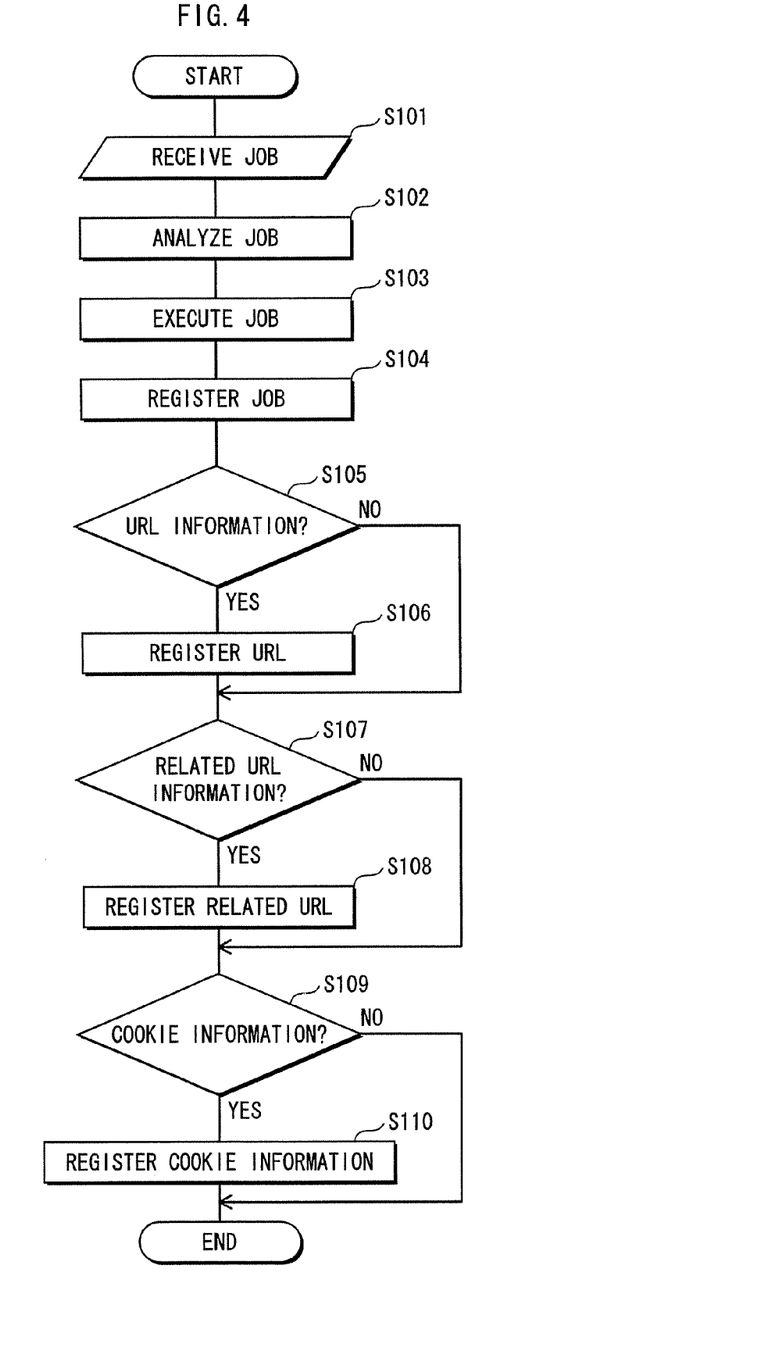
FIG. 4 shows operations performed when the image formation apparatus 10 pertaining to the embodiment of the present invention has received a job execution instruction from the user terminal 20.

FIG. 4 shows operations performed when the image formation apparatus 10 pertaining to the present embodiment of the present invention has received a job execution instruction from the user terminal 20.

Upon receiving the job execution instruction (step S101), the image formation apparatus 10 analyzes the received job execution instruction (step S102), executes the job in accordance with a result of the analysis (step S103), and registers the executed job (step S104).

If the received job execution instruction includes URL information (job URL information and browsing history information) (step S105:YES), the image formation apparatus 10 registers the included URL information along with the job identification information 41 etc. (step S106).

Also, if there is related URL information 46 (step S107: YES), the image formation apparatus 10 registers the related URL information 46 along with the job identification information 41 etc. (step S108).

If the received job execution instruction includes cookie information (step S109:YES), the image formation apparatus 10 registers the cookie information along with the job identification information 41 etc. (step S110).

Figure 6:
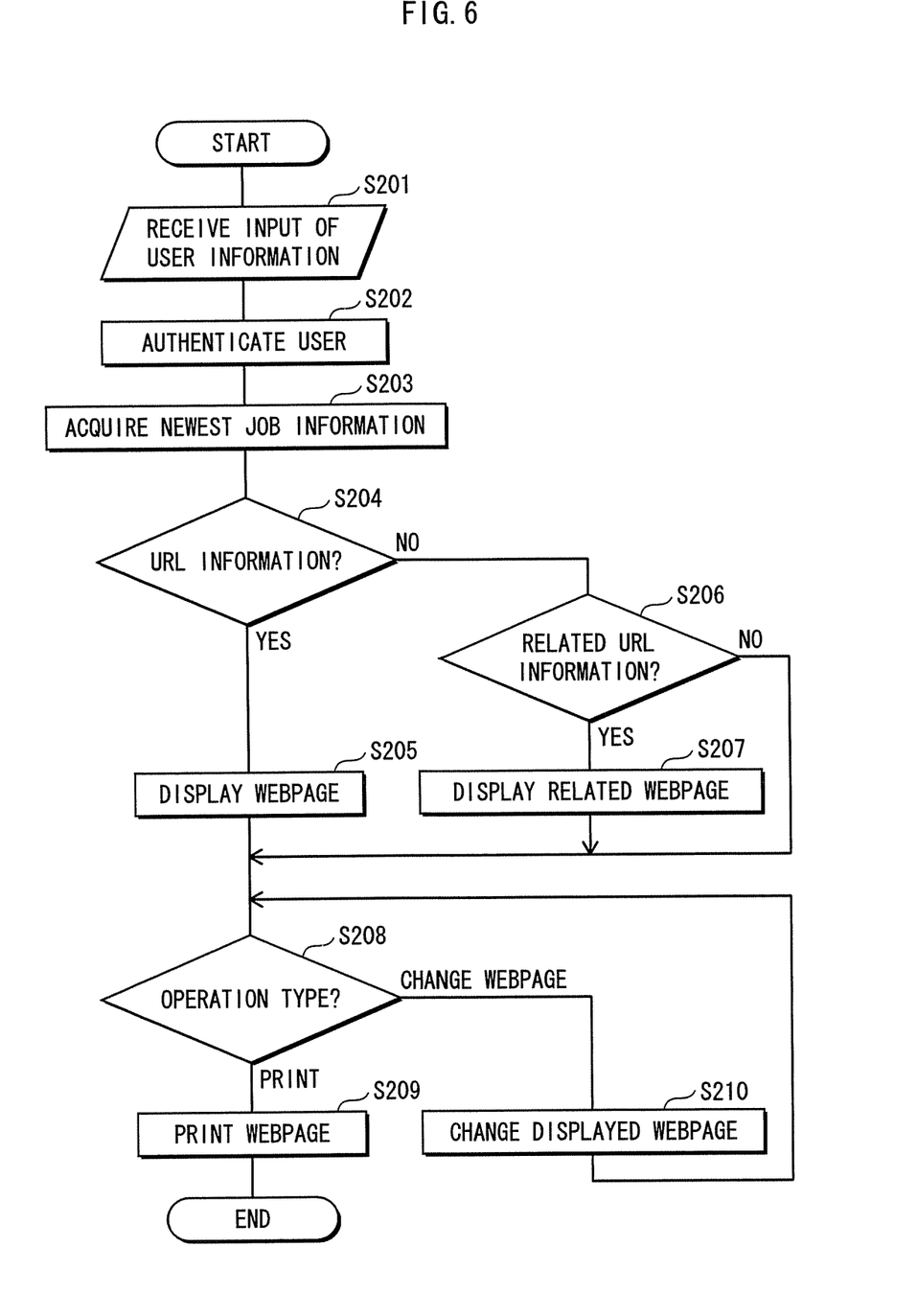
FIG. 6 shows operations performed when the image formation apparatus 10 pertaining to the embodiment of the present invention has received a login instruction from an operation panel.

FIG. 6 shows operations performed when the image formation apparatus 10 pertaining to the present embodiment of the present invention has received a login instruction via the operation panel.

Upon receiving a login instruction that includes user information (step S201), the image formation apparatus 10 performs user authentication (step S202), and acquires the newest piece of job information that has been registered in correspondence with the authenticated user (step S203). The newest job information can be specified by, for example, referencing reception times 48 of the job information pieces, and judging which was registered most recently.

If the acquired job information includes job URL information 43 (step S204:YES), the image formation apparatus 10 displays the webpage specified by the job URL information 43 on the display (step S205). Also, if the acquired job information does not include job URL information 43 (step S204: NO), but includes related URL information 46 (step S206: YES), the image formation apparatus 10 displays the webpage specified by the related URL information 46 on the display (step S207). Also, if the acquired job information does not include the job URL information 43 or the related URL information 46 (step S204:NO, step S206:NO), the image formation apparatus 10 displays a menu screen on the display. Note that the image formation apparatus 10 uses cookie information as necessary when acquiring the webpage from the web server 30.

If the user operation received from the operation panel is "PRINT", the image formation apparatus 10 prints the webpage displayed on the display (step S209). Also, if the user operation received from the operation panel is "CHANGE WEBPAGE", the image formation apparatus 10 displays, on the display, another webpage instead of the webpage currently being displayed (step S210). The user operation "CHANGE WEBPAGE" is received by, for example, the pressing of a "BACK" button, a "FORWARD" button, a "RELATED URL" button, or the like, that are displayed on a touch panel.

Accordingly, if a job execution instruction includes URL information, the image formation apparatus 10 of the present embodiment registers the URL information to enable viewing a webpage with use of the URL information. This structure therefore enables registering URL information without causing the user to feel bothered. Also, if user identification information has been input via the operation panel, the image formation apparatus 10 displays a webpage that is specified by the registered URL information. This structure therefore enables a user to view a webpage without feeling bothered.

Exemplary Screens

The following describes exemplary screens that are displayed on the display of the image formation apparatus 10.

Figure 7:
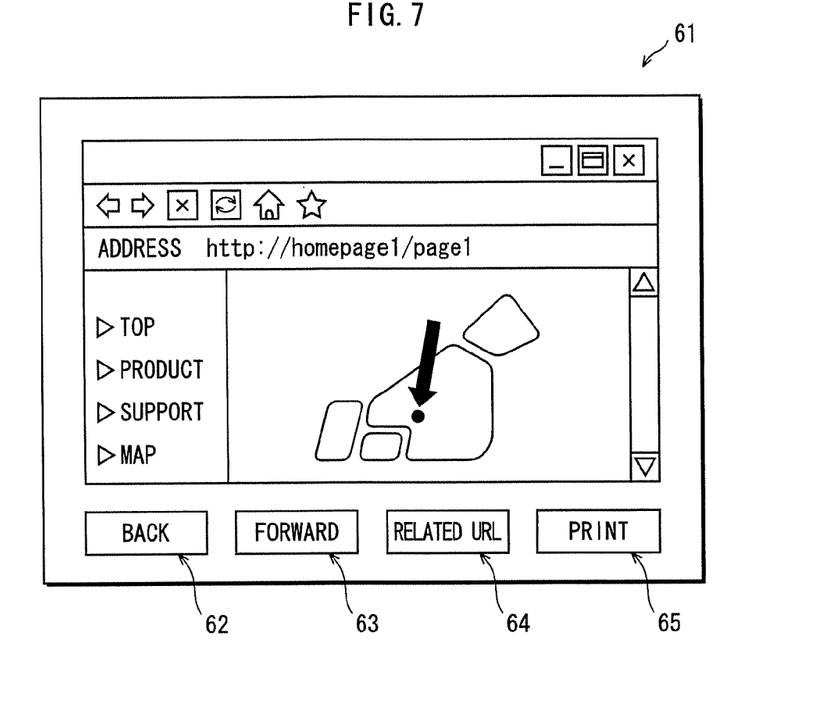
FIG. 7 shows an exemplary screen displayed on a display of the image formation apparatus 10.

For example, if the newest job information acquired by the image formation apparatus 10 is the job information of job A shown in FIG. 5, since the job information of job A includes the job URL information 43, the image formation apparatus 10 displays, on the display (that includes a touch panel function), a screen 61 that includes a webpage specified by the job URL information 43 (see FIG. 7). The screen 61 includes a back button 62, a forward button 63, a related URL button 64, and a print button 65 in addition to the webpage.

Figure 8:
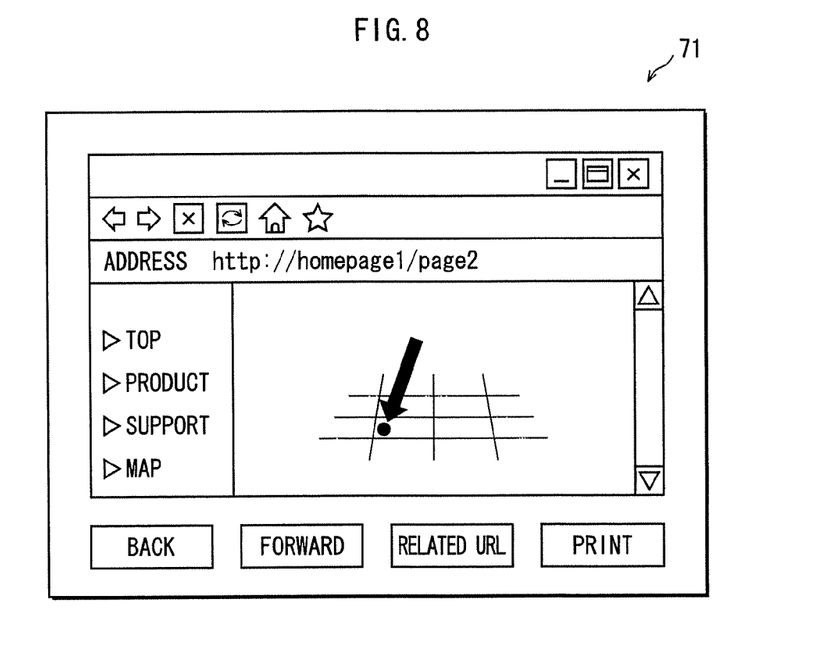
FIG. 8 shows an exemplary screen displayed on the display of the image formation apparatus 10.

If the back button 62 is pressed while the screen 61 including the webpage specified by the job JRL information 43 is being displayed, the image formation apparatus 10 displays, on the display, a screen 71 that includes a webpage specified by the first history URL information 44 (see FIG. 8) If the print button 65 is pressed while the screen 61 including the webpage specified by the job URL information 43 is being displayed, the image formation apparatus 10 prints the webpage specified by the job URL information 43.

Figure 9:
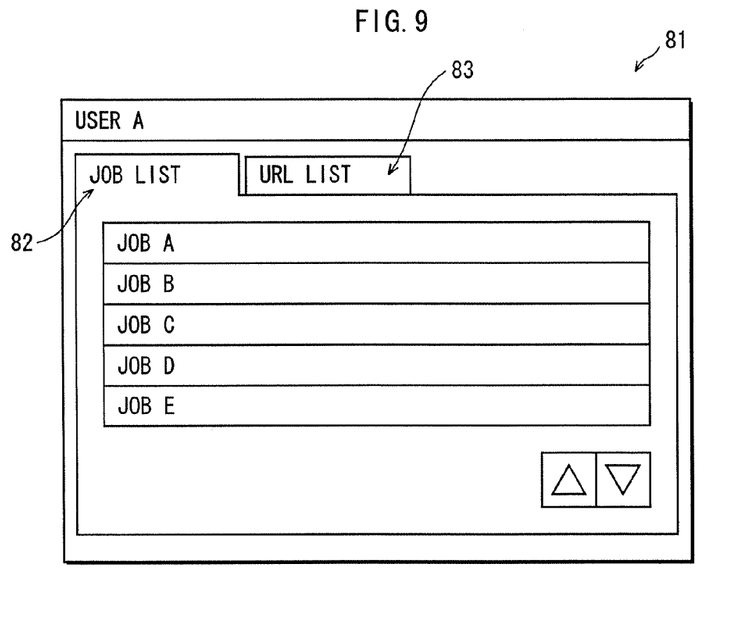
FIG. 9 shows an exemplary screen displayed on the display of the image formation apparatus 10.
Figure 10:
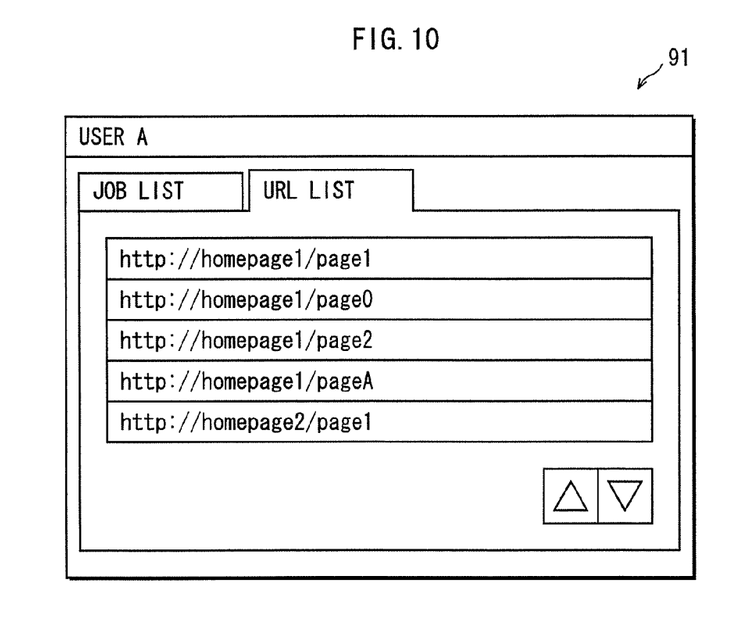
FIG. 10 shows an exemplary screen displayed on the display of the image formation apparatus 10.

Also, while the menu screen is being displayed, if a user operation for causing a job list to be displayed is received, the image formation apparatus 10 displays a screen 81 including the job list on the display (see FIG. 9). The screen 81 includes a tab 82 for selecting a job list and a tab 83 for selecting a URL list. If the table 83 is pressed while the screen 81 is being displayed, the image formation apparatus 10 displays a screen 91 that includes a URL list on the display (see FIG. 10). If "JOB A" is pressed while the screen 81 is being displayed, the image formation apparatus 10 acquires the job information of job A, and displays, on the display, the screen 61 that includes the webpage specified by the job URL information 43 (see FIG. 7).

Although an image formation apparatus of the present invention has been described based on the embodiment, the present invention is not limited to such embodiment. For example, the present invention includes variations such as the following.

(1) Although in the above embodiment, a webpage is necessarily displayed on the display if the newest job information includes the job URL information 43, the present invention is not limited to this. For example, even if the newest job information includes the job URL information 43, the menu screen may be displayed instead of the webpage if a predetermined time period has elapsed since the job URL information 43 was registered. This structure further improves convenience for the user.

(2) Although a webpage is displayed on the display based on the newest job information in the above embodiment, the present invention is not limited to this. If user authentication is successful, a job list (see FIG. 9) or a URL list (see FIG. 10) may be displayed, and a webpage selected by the user may be displayed on the display. Also, a character string of the URL information may be displayed in the URL list, or a thumbnail of a webpage obtained with use of the URL information may be displayed in the URL list.

(3) Although the above embodiment includes a case in which the image formation apparatus receives a job execution instruction from the user via the user terminal 20, the present invention is not limited to this. The image formation apparatus may receive a job execution instruction from the user via the operation panel. In such a case, the user would, for example, login to the image formation apparatus, use a browser mode to input URL information in order to cause a desired webpage to be displayed, and cause the displayed webpage to be printed. Thereafter, the image formation apparatus would register the user identification information included in the login instruction and the URL information that specifies the printed webpage in correspondence with each other. Accordingly, even if the user logs out after the printing has been completed, the same webpage is displayed again by the screen display part of the image formation apparatus when the user logs in again. This structure therefore enables the user to view the webpage without feeling bothered.

Note that in general, as the amount of time that has elapsed since logging out increases, the probability that the user will desire to view the same webpage when logging in again decreases, and the probability that the user will cause a completely different job to be executed increases. Therefore, when the user logs in again, the menu screen may be displayed if a predetermined time period has elapsed since the user last logged out. This structure further improves convenience for the user.

(4) The structure of the image formation apparatus 10 has been described in the embodiment with reference to the functional block diagrams. The functions of the blocks may be realized by software, or by hardware.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image formation apparatus that has a webpage viewing function, comprising:
   a job receiver configured to receive, from a user, a job execution instruction that includes user identification information and URI (Uniform Resource Identifier) information which specifies a webpage pertaining to a particular job;
   a job executor configured to execute the particular job in accordance with the received job execution instruction;
   a registration part configured to register the user identification information and a plurality of URI information in correspondence with the user identification information and the particular job such that webpages pertaining to the particular job can be viewed with use of the URI information included in the particular job;

a login instruction receiver configured to receive a login instruction that includes the user identification information, from the user via an operation panel; and a display part configured to display the webpage with use of the URI information that has been registered in correspondence with the user identification information included in the received login instruction, wherein if a plurality of pieces of the URI information have been registered in correspondence with the received user identification information, the display part displays the webpage with use of a most recently registered one of the URI information pieces, and if a predetermined time period has elapsed since the most recently registered URI information piece was registered, the display part displays a menu screen instead of displaying the webpage with use of the most recently registered URI information piece.

2. The image formation apparatus of claim 1, wherein the registration part registers other URI information in correspondence with the user identification information, the other URI information specifying a linked webpage that is linked to in the webpage specified by the URI information included in the job execution instruction, and upon reception of a user operation for causing the linked webpage to be displayed, the display part displays the linked webpage.

3. The image formation apparatus of claim 1, wherein the job receiver receives the job execution instruction one of (i) from the user, who has logged in, via the operation panel, and (ii) via a user terminal.

4. An image formation apparatus that has a webpage viewing function, comprising:

a job receiver configured to receive, from a user, a job execution instruction that includes user identification information and URI (Uniform Resource Identifier) information which specifies a webpage pertaining to a particular job;

a job executor configured to execute the particular job in accordance with the received job execution instruction;

a registration part configured to register the user identification information and a plurality of URI information in correspondence with the user identification information and the particular job such that webpages pertaining to the particular job can be viewed with use of the URI information included in the particular job;

a login instruction receiver configured to receive a login instruction that includes the user identification information, from the user via an operation panel; and a display part configured to display the webpage with use of the URI information that has been registered in correspondence with the user identification information included in the received login instruction, wherein the job receiver receives the job execution instruction via a user terminal, the job execution instruction further includes (i) a plurality of other URI information pieces, each specifying a different webpage that was viewed on the user terminal before the webpage pertaining to the particular job, and (ii) viewing order information that specifies an order in which the webpages specified by the other URI information pieces were viewed on the user terminal, the registration part registers the plurality of other URI information pieces and the viewing order information in correspondence with the user identification information, and the display part displays the webpages specified by the other URI information pieces in the viewing order specified by the viewing order information, in accordance with a user operation.

5. An image formation apparatus that has a webpage viewing function, comprising:

a job receiver configured to receive, from a user, a job execution instruction that includes user identification information and URI (Uniform Resource Identifier) information which specifies a webpage pertaining to a particular job;

a job executor configured to execute the particular job in accordance with the received job execution instruction;

a registration part configured to register the user identification information and a plurality of URI information in correspondence with the user identification information and the particular job such that webpages pertaining to the particular job can be viewed with use of the URI information included in the particular job;

a login instruction receiver configured to receive a login instruction that includes the user identification information, from the user via an operation panel; and a display part configured to display the webpage with use of the URI information that has been registered in correspondence with the user identification information included in the received login instruction, wherein the job receiver receives the job execution instruction from the user, who has logged in, via the operation panel, and upon reception of the login instruction from the user, who has logged out, the display part displays a menu screen instead of displaying the webpage with use of the registered URI information, if a predetermined time period has elapsed since the user logged out.

6. A non-transitory computer readable medium encoded with a program that causes an image formation apparatus which includes a webpage viewing function to perform the steps of:

receiving, from a user, a job execution instruction that includes user identification information and URI (Uniform Resource Identifier) information which specifies a webpage pertaining to a particular job;

executing the particular job in accordance with the received job execution instruction;

registering the user identification information and a plurality of URI information in correspondence with the user identification information and the particular job such that webpages pertaining to the particular job can be viewed with use of the URI information included in the particular job;

receiving a login instruction that includes the user identification information, from the user; and displaying the webpage with use of the URI information that has been registered in correspondence with the user identification information included in the received login inst if a plurality of pieces of the URI information have been registered in correspondence with the received user identification information, the displaying step displays the webpage with use of a most recently registered one of the URI information pieces, and if a predetermined time period has elapsed since the most recently registered URI information piece was registered, the display step displays a menu screen instead of displaying the webpage with use of the most recently registered URI information piece.

7. A non-transitory computer readable medium encoded with a program that causes an image formation apparatus which includes a webpage viewing function to perform the steps of:

receiving, from a user, a job execution instruction that includes user identification information and URI (Uniform Resource Identifier) information which specifies a webpage pertaining to a particular job;

executing the particular job in accordance with the received job execution instruction;

registering the user identification information and a plurality of URI information in correspondence with the user identification information and the particular job such that webpages pertaining to the particular job can be viewed with use of the URI information included in the particular job;

receiving a login instruction that includes the user identification information, from the user; and displaying the webpage with use of the URI information that has been registered in correspondence with the user identification information included in the received login instruction, wherein the job execution instruction is received via a user terminal, the job execution instruction further includes (i) a plurality of other URI information pieces, each specifying a different webpage that was viewed on the user terminal before the webpage pertaining to the particular job, and (ii) viewing order information that specifies an order in which the webpages specified by the other URI information pieces were viewed on the user terminal, the plurality of other URI information pieces and the viewing order information are registered in correspondence with the user identification information, and the webpages specified by the other URI information pieces are displayed in the viewing order specified by the viewing order information, in accordance with a user operation.

8. A non-transitory computer readable medium encoded with a program that causes an image formation apparatus which includes a webpage viewing function to perform the steps of:

receiving, from a user, a job execution instruction that includes user identification information and URI (Uniform Resource Identifier) information which specifies a webpage pertaining to a particular job;

executing the particular job in accordance with the received job execution instruction;

registering the user identification information and a plurality of URI information in correspondence with the user identification information and the particular job such that webpages pertaining to the particular job can be viewed with use of the URI information included in the particular job;

receiving a login instruction that includes the user identification information, from the user via an operation panel; and displaying the webpage with use of the URI information that has been registered in correspondence with the user identification information included in the received login instruction, wherein the job execution instruction is received from the user, who has logged in, via the operation panel, and upon reception of the login instruction from the user, who has logged out, a menu screen is displayed instead of displaying the webpage with use of the registered URI information, if a predetermined time period has elapsed since the user logged out.

* * * * *